(12) United States Patent
Genet

(10) Patent No.: US 7,398,577 B2
(45) Date of Patent: Jul. 15, 2008

(54) WINDSCREEN WIPER DEVICE

(75) Inventor: Sophie Genet, Saint-Laurent-sur-Othain (FR)

(73) Assignee: Federal - Mogul S.A., Aubange (BE)

( * ) Notice: Subject to any disclaimer, the term of this patent is extended or adjusted under 35 U.S.C. 154(b) by 35 days.

(21) Appl. No.: 11/144,435

(22) Filed: Jun. 3, 2005

(65) Prior Publication Data
US 2006/0272119 A1   Dec. 7, 2006

(51) Int. Cl.
*B60S 1/40* (2006.01)
(52) U.S. Cl. ................... 15/250.32; 15/250.351
(58) Field of Classification Search ............ 15/250.32, 15/250.351, 250.43, 250.44, 250.46
See application file for complete search history.

(56) References Cited

U.S. PATENT DOCUMENTS

| 4,896,987 | A | 1/1990 | Pethers |
| 6,599,051 | B1 * | 7/2003 | Jarasson ............... 403/326 |
| 6,654,983 | B1 * | 12/2003 | Raynaud ............... 15/250.32 |
| 2004/0211021 | A1 | 10/2004 | Weber et al. |

FOREIGN PATENT DOCUMENTS

| DE | 4224866 | * | 2/1994 |
| EP | 0 231 129 | | 8/1987 |
| EP | 0236061 | | 9/1987 |
| EP | 0 895 907 | | 2/1999 |
| EP | 1403156 A1 | | 3/2004 |
| FR | 2 453 757 | | 11/1980 |
| FR | 2 759 048 | | 8/1998 |
| FR | 2 771 694 | | 6/1999 |
| FR | 2 781 741 | | 2/2000 |
| WO | WO 00/07857 | | 2/2000 |
| WO | WO 00/40444 | | 7/2000 |
| WO | WO 02/34594 A1 | | 5/2002 |

* cited by examiner

*Primary Examiner*—Gary K Graham
(74) *Attorney, Agent, or Firm*—Robert L. Stearns; Dickinson Wright PLLC

(57) ABSTRACT

A windscreen wiper device comprising at least one yoke which is attached to a carrier in such a manner as to be capable of pivotating movement about a first pivot axis, wherein both said carrier and said yoke have a substantially U-shaped cross-section at the location of their interconnection, said windscreen wiper device further comprising a oscillating arm pivotally connected to said carrier about a second pivot axis near one end, wherein said carrier is provided, at the location of said second pivot axis, with a transverse shaft, with the special feature that said oscillating arm and said carrier are interconnected with the interposition of a joint part, wherein said joint part comprises at least one resilient tongue engaging in a correspondingly shaped hole provided in said oscillating arm.

6 Claims, 4 Drawing Sheets

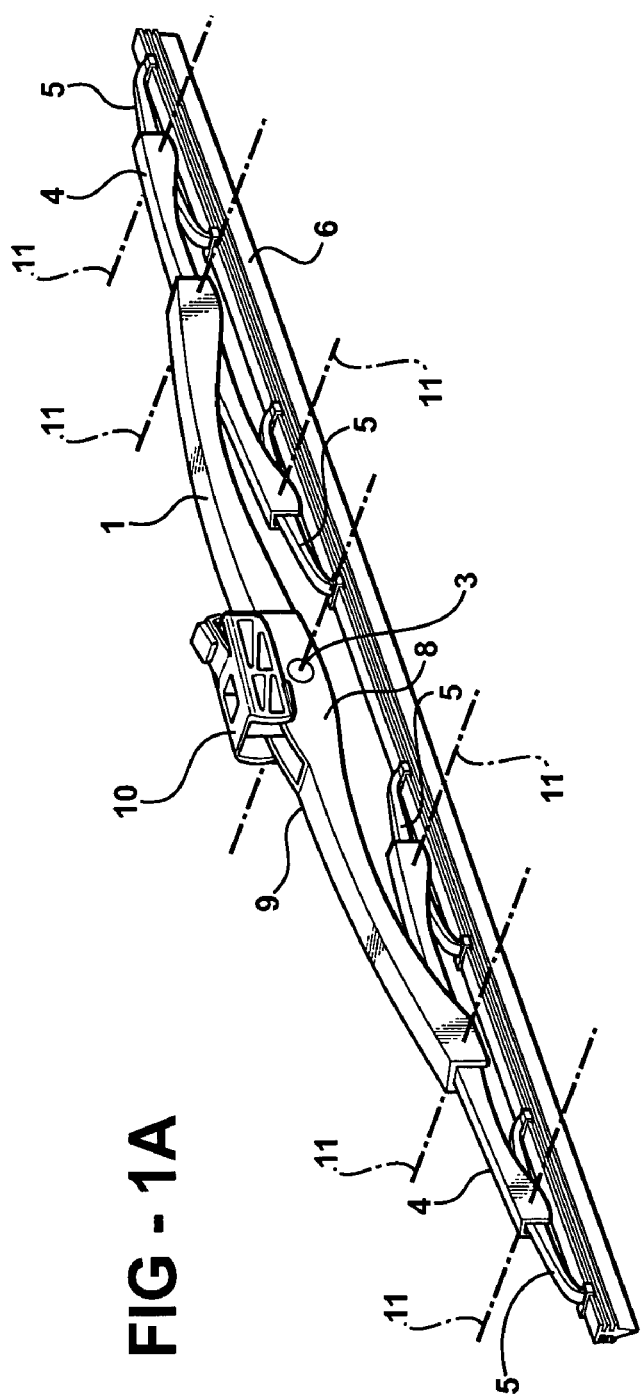
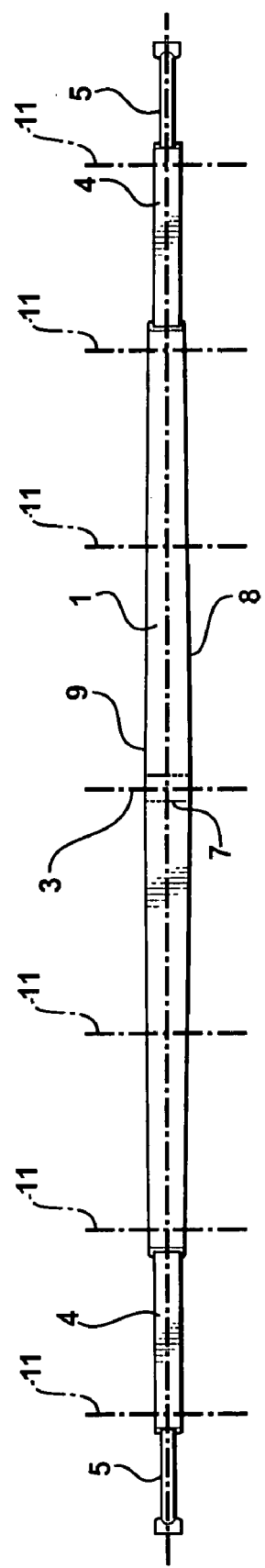
FIG - 1A
FIG - 1B

WINDSCREEN WIPER DEVICE

BACKGROUND OF THE INVENTION

1. Technical Field

The present invention is related generally to windscreen wiper devices. More particularly, the invention relates a windscreen wiper device having a joint part for interconnecting a carrier of the windscreen wiper device with an oscillating wind screen wiper arm.

2. Related Art

A windscreen wiper device of this type is generally known and is usually provided with a plurality of yokes, in order to ensure that a wiper blade thereof is in contact with a, usually curved, windscreen along its entire length. Each yoke is thereby pivoted to the end of a carrier in its central portion, which carrier itself may also be a yoke. Usually said carrier and yoke(s) are made of metal, so that a plastic part often called "spacer" is interposed at the location of the connection of a carrier and a yoke, said plastic part being stationary with respect to a carrier associated therewith. The oscillating arm has a hook-shaped end hooking up the shaft of the carrier.

A disadvantage of such a known windscreen wiper device is that, due to high forces exerted in practice on the connection between the oscillating arm and the carrier, the reliability of said connection appears to diminish with the passage of time, resulting in play between the oscillating arm and the carrier. Such a play in practice has proven to lead to frictional contact between these parts and therefore leads to wear.

SUMMARY OF THE INVENTION

The object of the invention is to overcome these drawbacks of the prior art as indicated above, in particular to provide a windscreen wiper device wherein the carrier and the oscillating arm are interconnected in a simple though durable and solid manner.

In order to accomplish that objective a windscreen wiper device of the type referred to in the introduction is characterized according to the invention in that said oscillating arm and said carrier are interconnected with the interposition of a joint part, wherein said joint part comprises at least one resilient tongue engaging in a correspondingly shaped hole provided in said oscillating arm. This makes it possible to realize an effectively operating and reliable joint being extremely wear resistant, whilst minimizing the number of parts.

In one preferred embodiment of a windscreen wiper device in accordance with the invention said oscillating arm has an at least substantially U-shaped cross-section at the location of its connection to said joint part, wherein said hole is provided in a base of said U-shaped cross-section.

In another preferred embodiment of a windscreen wiper device according to the invention said joint part comprises at least two lateral resilient tongues extending outwardly, wherein said oscillating arm has an at least substantially U-shaped cross-section at the location of its connection to said joint part, and wherein each tongue engages in a correspondingly shaped hole provided in a leg of said U-shaped cross-section.

In another preferred embodiment of a windscreen wiper device in accordance with the invention said hole(s) has/have a closed circumference. Such (a) closed hole(s) enhance(s) the retention of the oscillating arm onto the carrier in all directions, particularly both horizontally and vertically.

In another preferred embodiment of a windscreen wiper device according to the invention said oscillating arm has an at least substantially U-shaped cross-section at the location of its connection to said joint part, wherein each leg of said U-shaped cross-section comprises clamping members which engage around longitudinal sides of said joint part that face away from each other. These clamping members being preferably formed as inwardly bended edges of the U-shaped cross-section serve to further enhance the retention of the oscillating arm onto the carrier in vertical direction, that is perpendicular to the longitudinal direction of the oscillating arm.

In another preferred embodiment of a windscreen wiper device in accordance with the invention said shaft pivotally engages in said joint part. In particular, said shaft can be pivotally mounted in at least one correspondingly shaped recess in said joint part.

In another preferred embodiment of a windscreen wiper device according to the invention said shaft can be snapped into said recess.

In another preferred embodiment of a windscreen wiper device in accordance with the invention said shaft is dimensioned such that it can be passed through an insertion opening of the recess from an at least substantially perpendicular position of said oscillating arm with respect to said carrier, and be locked in position in said recess from an at least substantially parallel position of said oscillating arm with respect to said carrier. In the mounting position, the shaft can be freely inserted into the insertion opening of the recess and subsequently be mounted in said recess, whilst in the operative position the shaft is locked in position in said recess, so that it cannot move out of said recess via the insertion opening.

In another preferred embodiment of a windscreen wiper device according to the invention said shaft is formed by two protrusions each extending inwardly on a longitudinal side of said carrier. Preferably said protrusions are cylindrical and form two cylindrical bearing surfaces. The two protrusions that function as bearing surfaces are spaced far apart, so that the forces that are exerted on said bearing surfaces will be relatively low.

In another preferred embodiment of a windscreen wiper device in accordance with the invention said shaft is formed by a pin extending from one longitudinal side to another longitudinal side of said carrier.

In another preferred embodiment of a windscreen wiper device according to the invention said joint part is made of plastic, which includes any synthetic material having some flexibility.

BRIEF DESCRIPTION OF THE DRAWINGS

The invention will now be explained in more detail with reference to figures illustrated in a drawing, wherein:

FIG. 1a is a perspective, schematic view of a preferred embodiment of a windscreen wiper device in accordance with the invention;

FIG. 1b is a top view of a windscreen wiper device of FIG. 1a;

FIGS. 2, 3 and 4 are several perspective, schematic views of a joint part used in a windscreen wiper device of FIG. 1a;

DETAILED DESCRIPTION OF THE PREFERRED EMBODIMENT

Figure 2:
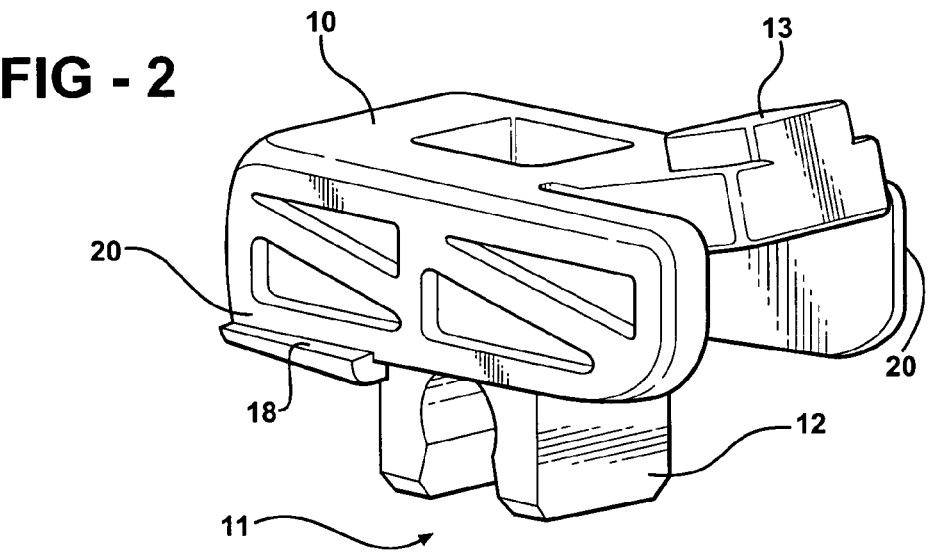

FIG. 1a shows a perspective view of a windscreen wiper device equipped with a first yoke 1 which can be pivotally attached to an oscillating arm 2 at the location of a pivot axis 3. The first yoke 1 functions as a carrier of two secondary yokes 4, which secondary yokes 4 function as carriers of four tertiary yokes 5. All yokes are pivot-mounted in their respective carriers, such as, for example, pivot axis 11, so that a force exerted at the location of the pivot axis 3 is distributed more or less evenly over the ends of the tertiary yokes 5, capable of being transferred to a rubber wiping element 6, which can be fitted on the ends of the tertiary yokes 5.

Figure 3:
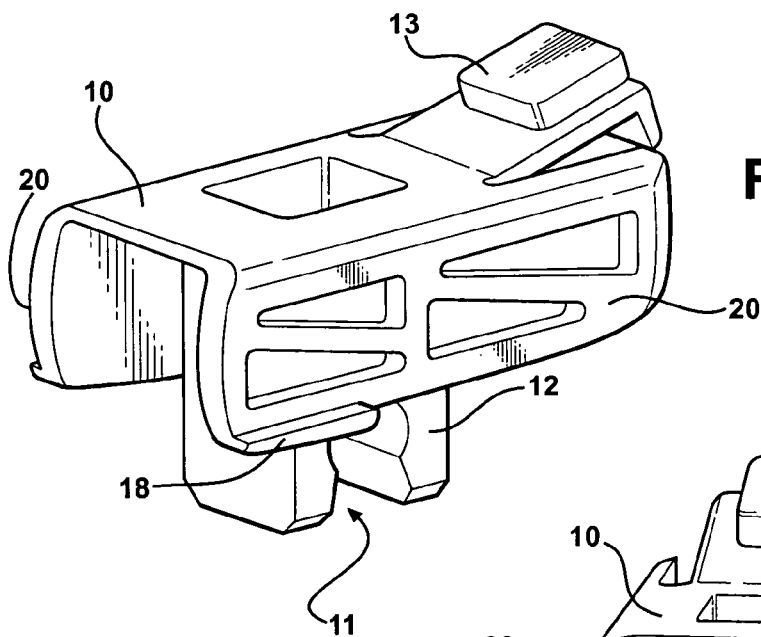
Figure 4:
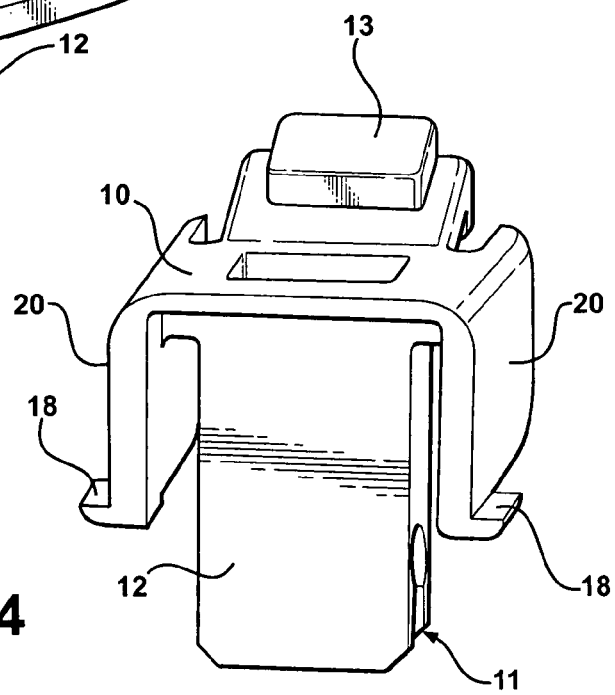
Figure 5:
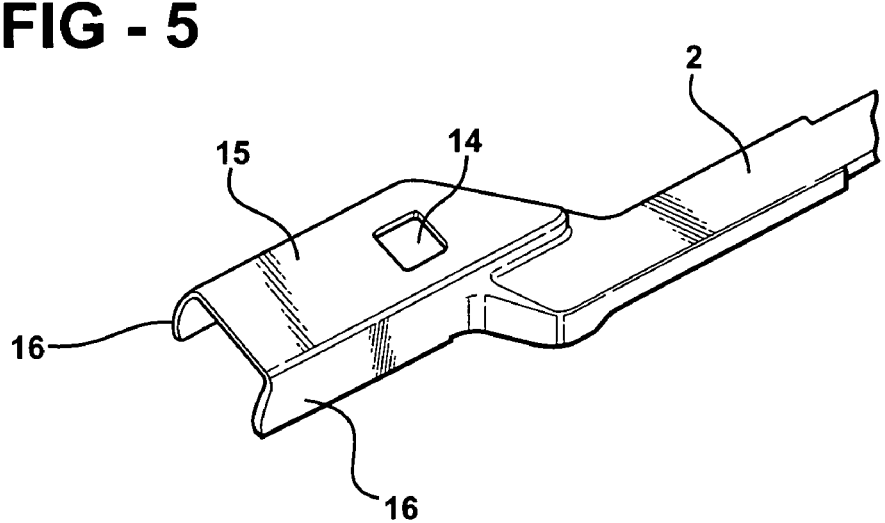
FIG. 5 is a perspective, schematic view of a part of an oscillating arm used in a windscreen wiper device of FIGS. 1a and 1b, seen from above.

As can be seen from FIG. 1b, the first yoke 1 is provided, at the location of the pivot axis 3, with a shaft in the form of a transverse pin 7 extending from one longitudinal side 8 to another longitudinal side 9 of the first yoke 1. A joint part 10 is snapped ("clipped") onto the pin 7, in such a manner that the pin 7 is pivotally mounted in a correspondingly shaped recess 11 in a downwardly extending portion 12 of the joint part 10 (FIGS. 2 and 3).

With reference to FIGS. 2, 3, 4, 5 and 6 the oscillating arm 2 has a substantially U-shaped cross-section at the location of its connection to the joint part 10, so that a resilient tongue 13 of the joint part 10 engages in an identically shaped hole 14 provided in a base 15 of the substantially U-shaped cross-section. By substantially U-shaped, it is meant that the cross-section has a generally U-shaped profile but may also accommodate other features of the oscillating arm in the base 15 or legs 16 of the U-shape without departing from the U-shaped nature of the profile. While mounting the oscillating arm 2 onto the first yoke 1/joint part 10, the resilient tongue 13 is initially pushed against a spring force and then allowed to spring back into the hole 14, thus snapping, that is clipping the resilient tongue 13 into the hole 14. This is a so-called bayonet-connection.

Figure 6:
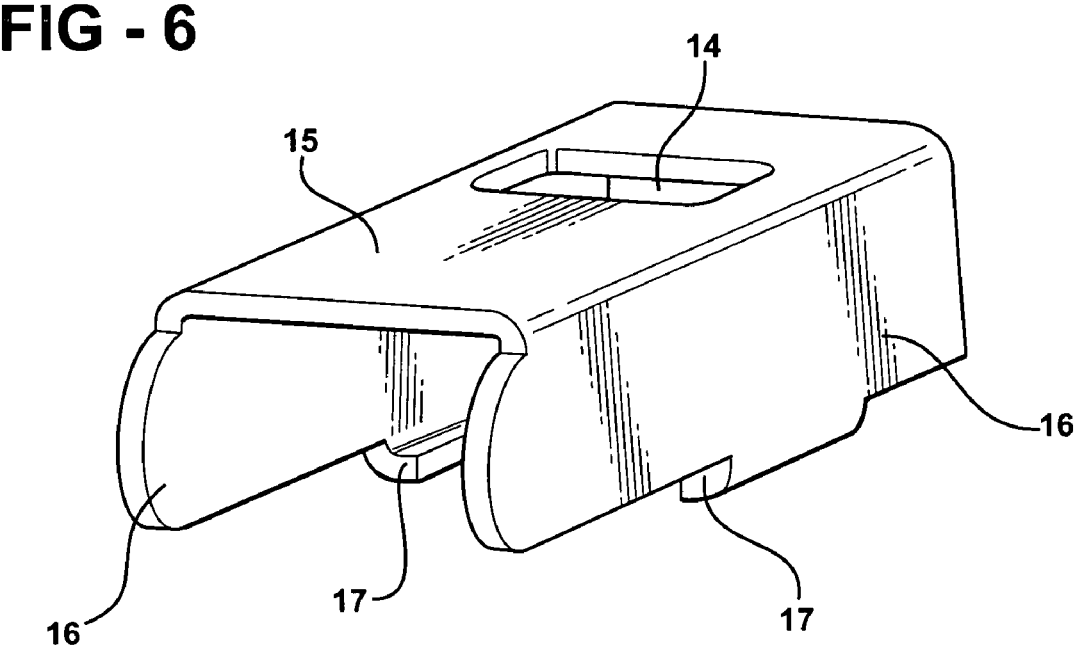
FIG. 6 is a perspective, schematic view of an end of an oscillating arm used in FIG. 5.
Figure 7:
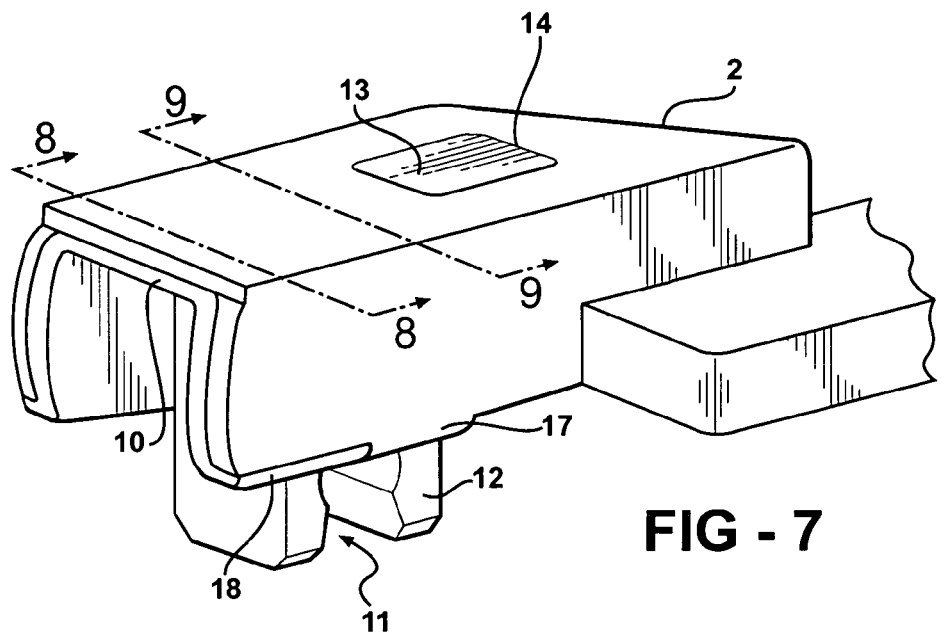
FIG. 7 is a perspective, schematic view of an end of an oscillating arm/joint part assembly.
Figure 8:
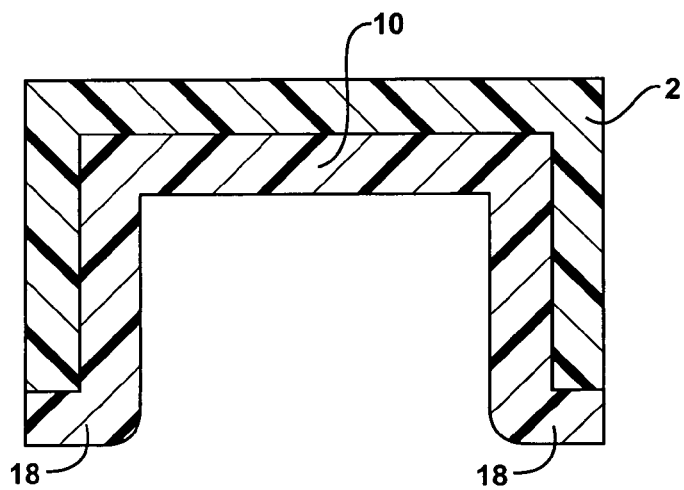
FIG. 8 is a cross-section view of the assembly of FIG. 7 taken along line 8-8.
Figure 9:
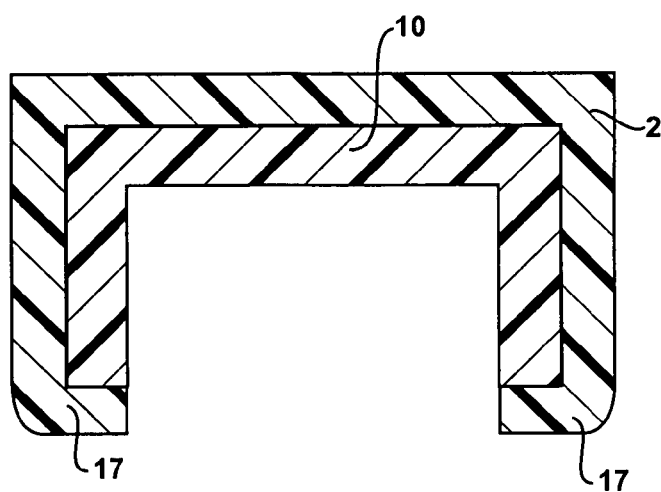
FIG. 9 is a cross-section view of the assembly of FIG. 7 taken along line 9-9.

Each leg 16 of the U-shaped cross-section comprises clamping members which engage round longitudinal sides 20 of the joint part 10 that face away from each other. In FIG. 6 these clamping members are formed as inwardly bended edges 17 integral with the legs 16 of the U-shaped cross-section, serving to further enhance the retention of the oscillating arm 2 onto the first yoke 1/joint part 10 in vertical direction, that is perpendicular to the longitudinal direction of the oscillating arm 2. The bended edges 17 retain the longitudinal sides of the joint part 10 while legs 8 and 9 rest upon protrusions 18 which extend from the longitudinal sides of the joint part 10, as shown in FIGS. 7, 8 and 9. At the location of the bended edges 17 the oscillating arm 2 has a more or less C-shaped cross-section. The oscillating arm 2 is clipped onto the joint part 10 through a longitudinal movement of the oscillating arm 2.

The invention is not restricted to the variants shown in the drawing, but is also extends to other embodiments that fall within the scope of the appended claims. For example, a skilled person would realize that the resilient tongue 13 could also extend laterally outwardly, so that the resilient tongue 13 engages in an identically shaped hole 14 provided in a leg 16 of the U-shaped cross-section.

Obviously, many modifications and variations of the present invention are possible in light of the above teachings. It is, therefore, to be understood that within the scope of the appended claims, the invention may be practiced otherwise than as specifically described.

The invention claimed is:

1. A windscreen wiper device comprising at least one yoke which is attached to a carrier in such a manner as to be capable of pivoting movement about a first pivot axis, wherein both said carrier and said yoke have a substantially U-shaped cross-section at the location of their interconnection, said windscreen wiper device further comprising an oscillating arm pivotally connected to said carrier about a second pivot axis near one end, wherein said carrier is provided, at the location of said second pivot axis, with a transverse shaft, wherein said oscillating arm and said carrier are interconnected with the interposition of a joint part, and wherein said transverse shaft is pivotally snapped in a correspondingly shaped recess in a downwardly extending portion of said joint part, said joint part including at least one resilient tongue engaging in a correspondingly shaped hole provided in said oscillating arm, wherein said oscillating arm has an at least substantially U-shaped cross-section at the location of its connection to said joint part, and wherein each leg of said U-shaped cross-section comprises inwardly bended edges which engage around longitudinal sides of said joint part that face away from each other, and said joint part including laterally outwardly projecting protrusions formed along said longitudinal sides of said joint part and extending beneath longitudinal lower edges of said legs of said oscillating arm adjacent said bent edges.

2. A windscreen wiper device according to claim 1, wherein said hole is provided in a base of said U-shaped cross-section of the arm.

3. A windscreen wiper device according to claim 1, wherein said hole has a closed circumference.

4. A windscreen wiper device according to claim 1, wherein said shaft is dimensioned such that it can be passed through an insertion opening of the recess from an at least substantially perpendicular position of said oscillating arm with respect to said carrier, and be locked in position in said recess from an at least substantially parallel position of said oscillating arm with respect to said carrier.

5. A windscreen wiper device according to claim 1, wherein said shaft is formed by a pin extending from one longitudinal side to another longitudinal side of said carrier.

6. A windscreen wiper device according to claim 1, wherein said joint part is made of plastic.

* * * * *